Patented Nov. 24, 1925.

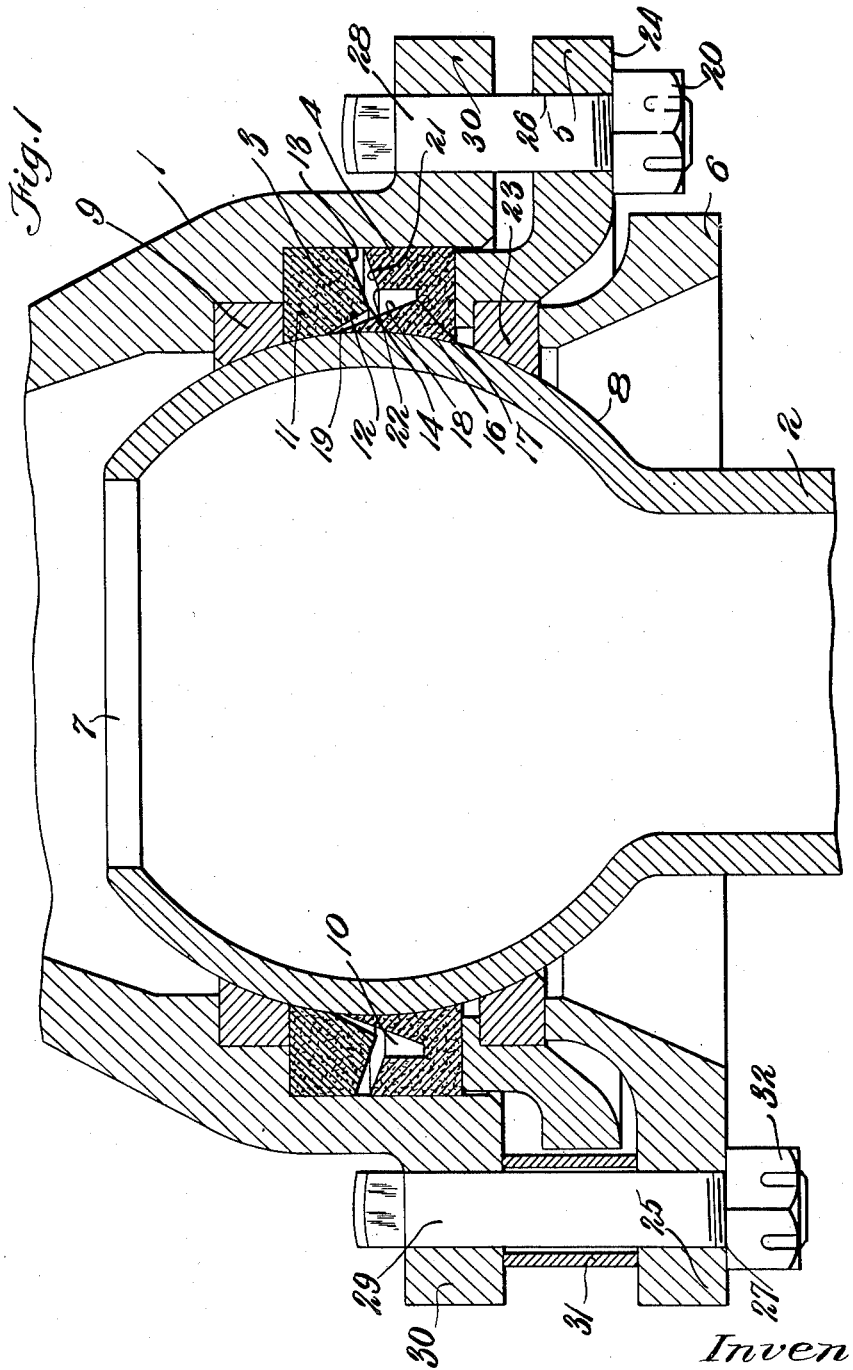

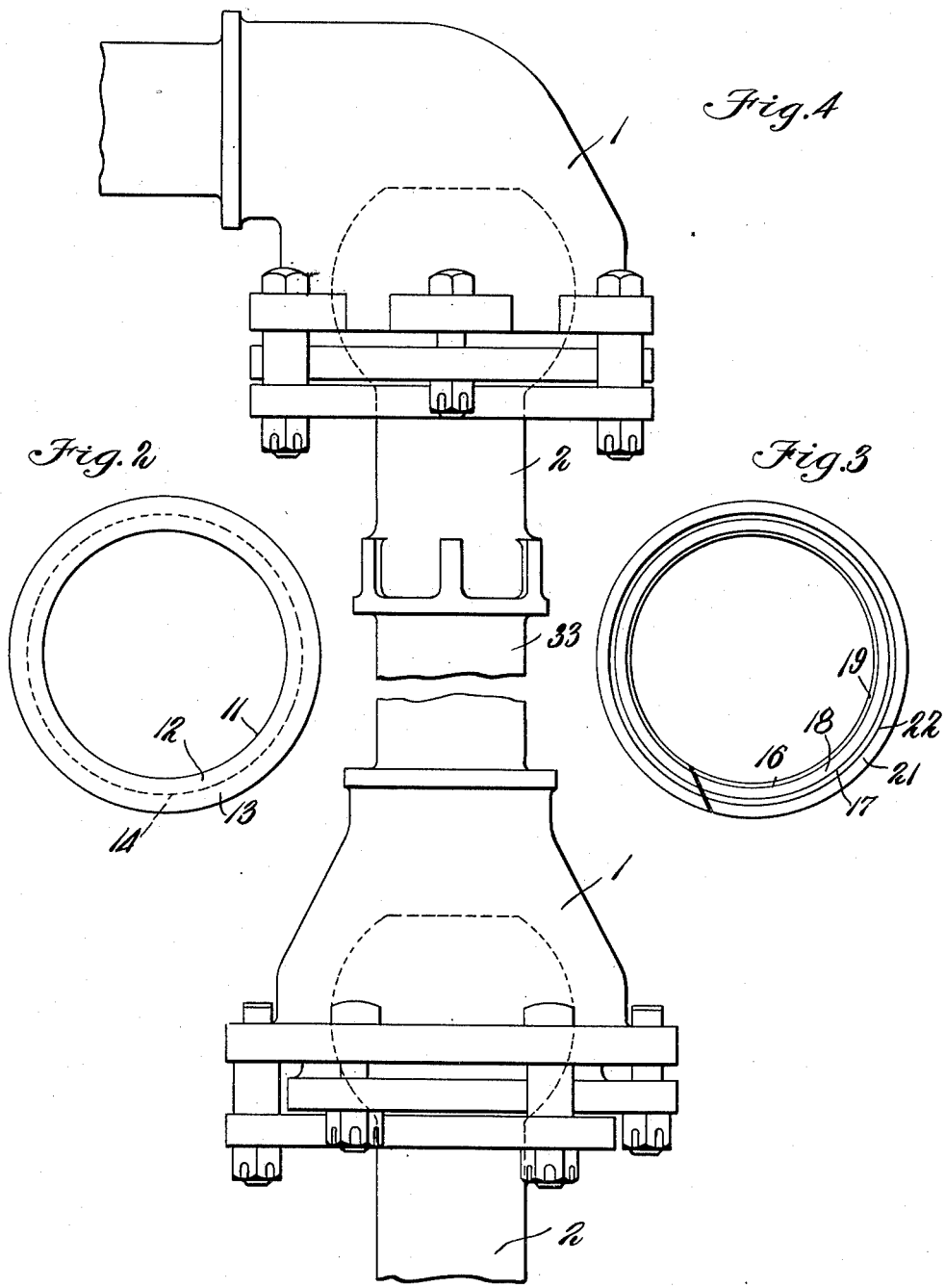

1,563,161

UNITED STATES PATENT OFFICE.

GEORGE CHRISTENSON, OF NORTH PLAINFIELD, NEW JERSEY, ASSIGNOR TO JOHNS-MANVILLE, INC., OF NEW YORK, N. Y., A CORPORATION OF NEW YORK.

PRESSURE PACKING.

Application filed April 26, 1924. Serial No. 709,262.

*To all whom it may concern:*

Be it known that I, GEORGE CHRISTENSON, a citizen of the United States of America, and resident of North Plainfield, in the county of Somerset and State of New Jersey, have invented new and useful Improvements in Pressure Packing, of which the following is a specification.

The present invention relates to pressure packing and more particularly to a ring packing suitable for universal or swivelled connections in steam lines and the like.

In various mechanical constructions involving a flexible connection between two sections of a pressure line, it becomes necessary to provide a packing which shall prevent escape of the medium under pressure and which shall be substantially free from frictional wear, especially when not required for sealing the coupling connection.

For example, in such equipment as "booster" engines, which may be attached to locomotive tenders or the like and which are used intermittenly to supplement the tractive power of a locomotive in starting or upon up-grades, it is necessary to provide a flexible steam connection between it and the boiler of the locomotive.

It is therefore an object of this invention to provide a packing, which will serve these purposes and which may be easily assembled and capable of withstanding the conditions of use imposed upon it for a relatively long period of time. Other objects will appear from the following disclosure.

In accordance with the invention, the connections to which it is applied need not be fluid-tight except when in use, and the packing is not tightly retained in the coupling except at such times, thus avoiding unnecessary wear. However, upon the passage of steam through the connecting line, the packing seals the joint, which continues to be fluid-tight until the steam pressure is cut off.

A specific adaptation of the invention for this purpose will be described, with reference to the following drawings, in which:

Fig. 1 is an axial cross-section of a coupling, packed in accordance with the invention;

Fig. 2 is a detail plan view of one section of the packing;

Fig. 3 is a detail plan view of the other section of the packing; and

Fig. 4 is a side view of two universal couplings assembled to form a flexible connection, with parts broken away.

Referring to Fig. 1, the numeral 1 designates the socket section of a coupling and numeral 2 the ball section fitting within the socket section. the joint between them being packed by rings 3 and 4. The ball member is hollow, having an outlet into the socket member at 7 and a spherical exterior bearing surface 8.

The packing rings 3 and 4 are preferably made from suitably resilient or elastic packing material, which is form-sustaining under normal conditions, such for example as impregnated asbestos fabric, and are shaped in any well-known manner to the desired form and dimensions, which will be more particularly described below.

The socket member 1, is provided with an annular metallic bearing ring 9 fitting therein, which is of sufficient size to receive ball member 2, and against which is seated the upper packing ring 3. This packing ring has its inner side shaped to fit loosely against the outer surface 8 of the ball member 2, while its lower face comprises two annular surfaces 12 and 13 projecting downwardly and meeting in the edge 14. Lower packing ring 4 also has its inner surface 16 shaped to fit loosely over the outer surface of ball member 2, and is provided with a V-shaped annular channel 17 in its upper face, the inner wall 18 of which extends upwardly to meet surface 16 at an acute angle forming a projecting, tapered, resilient tongue or lip 19, while the outer wall of the channel is substantially parallel to the axis of the ring, meeting the upper inclined surface 21 in the edge 22.

The opposed surfaces of the packing rings are, therefore, substantially complementary to each other, the surfaces 12 and 13 of ring 3 being substantially parallel to but spaced respectively from the surfaces 18 and 21 of the ring 4 to provide an annular fluid chamber 10 which includes the channel 17 and also the narrow entrance passage between surfaces 18 and 21 leading to said channel.

The under surface of the packing ring 4 rests upon the packing gland 5, while an annular metallic bearing ring 23, which is shaped to fit against the spherical bearing surface 8 of the member 2, is held in place by the packing gland 6.

Upon the outer edges of glands 5 and 6 are provided radial flanges 24 and 25, respectively, having openings 26 and 27 therein to receive bolts 28 and 29. The bolts pass through a flange 30, carried by the socket member 1, and are furnished with nuts 20 and 32 to permit the parts to be drawn together. Intermediate the flanges 25 and 30, bolts 29 are provided with spacing sleeves 31.

The assembly and operation of the packed coupling will now be clearly understood. The bearing ring 9 is first introduced into the socket member 1 and packing ring 3 is then placed against it with its edge 14 facing outwardly. Ring 4 (which may conveniently be split to facilitate putting it in place) is then slipped over the bearing surface 8 of ball 2, with its channeled surface opposing ring 3.

The ball member is now inserted in the socket member 1 with its spherical surface 8 resting against the inner surfaces of the rings 9 and 3. Packing gland 5 is then placed against the under side of ring 4 and bolts 28 are inserted through openings 26 in flange 24 and through the flange 30 on the socket member of the coupling. The bolts are drawn up tight by means of nuts 20 thus seating the packing rings 3 and 4 firmly together. The nuts are then slightly retracted, allowing the packing rings to separate. The nuts are again tightened, but with the fingers only, leaving the space 10 between the rings. The metal bearing ring 23 is then put in place against the surface 8, and packing gland 6 laid thereagainst. Bolts 29 are inserted through flange 30, sleeves 31, and openings 27 in the flange 25 of packing gland 6 and their nuts 32 are tightened until the gland 6 is clamped firmly against the ends of the sleeves 31.

The coupling is now assembled and ready for use. The ball member and pipe, or other elements connected with the socket member 1, such as the pipe 33 (Fig. 4), will be free to turn in all directions and to rotate within the socket member 1. The surface 8 will slide freely upon the metal bearing rings 9 and 23 and within the surfaces 11 and 16 of the packing rings 3 and 4. It is especially to be observed that the packing rings are not normally compressed against surface 8, but may stand very slightly away from it, and that therefore there will be little or no tendency to friction or wear.

When steam is introduced through the line (in either direction) the only possible course of escape will be between surface 8 and metal ring 9. This it may do to some extent, particularly when the ring has become appreciably worn from use. Some of this escaping steam will penetrate between surface 8 and the surface 11 of packing ring 3. When it reaches the space 10 between the packing rings, it will expand into the V-shaped channel 17, forcing the resilient V-shaped tongue or lip 19 against the lower portion of surface 8, effectually sealing the crevice between them and preventing further exit and loss of steam or reduction of pressure in the line.

When the steam pressure is cut off, the resilient lip 19 will resume its original position, slightly spaced from the surface 8 or at least not in pressure contact therewith. But in either position, or under either condition, the coupling is freely movable as a universal joint without undue resistance or wear upon the packing rings.

The materials from which packing rings 3 and 4 may be made will vary, depending upon the specific circumstances involved. However, it is preferable that they be form-sustaining when not under pressure, sufficiently resistant to the pressure medium employed, to prevent serious or rapid alteration of its original characteristics, and slightly resilient when subjected to the pressures used. Other subordinate modifications may be made, within the invention.

I claim:

1. A packing for ball and socket pipe joints comprising a pair of coaxial rings, one of said rings having a substantially V-shaped annular groove in its end face, the inner wall of said groove projecting beyond the end face of the ring to provide a resilient tongue engageable with the ball, and the opposed end face of the other ring comprising annular surfaces normally spaced from the outer face of said tongue and from the end face of the first ring respectively.

2. In combination, in a universal joint pipe-coupling, having ball and socket members, a pair of spaced bearing rings, a pair of opposed packing rings intermediate said bearing rings and fitting loosely together, and a resilient lip projecting from one of said packing rings toward the opposed face of the other packing ring, said lip being engageable with the surface of the ball member.

3. In combination, in a universal joint pipe-coupling, having ball and socket members, a pair of spaced bearing rings, a pair of packing rings intermediate said bearing rings, said packing rings having complementary opposed faces, one of said opposed faces having a V-shaped annular channel, and a tapering lip forming the inner wall of said channel, said lip being engageable with the surface to be packed.

4. In combination, in a universal joint pipe-coupling, having ball and socket members, a pair of spaced bearing rings having their inner surfaces shaped to the spherical contour of said ball member, a pair of opposed packing rings intermediate said bearing rings and fitting loosely together, and a resilient lip projecting from one of said packing rings toward the opposed face of the other packing ring, said lip being engageable with the surface of the ball member.

Signed by me at New York city, this 18th day of April, 1924.

GEORGE CHRISTENSON.